United States Patent

Tsukagoshi

[15] 3,643,035

[45] Feb. 15, 1972

[54] MULTICHANNEL MAGNETIC HEAD HAVING A COMMON GROUND TERMINAL COUPLED TO A PIECE OF MAGNETIC MATERIAL ON THE FACE OF THE HEAD

[72] Inventor: Tsunehiro Tsukagoshi, Tokyo, Japan

[73] Assignee: Pioneer Electronic Corporation, Tokyo, Japan

[22] Filed: Sept. 17, 1969

[21] Appl. No.: 858,674

[30] Foreign Application Priority Data

Sept. 17, 1968 Japan....................................43/66561

[52] U.S. Cl. ........................................179/100.2CH, 29/603

[51] Int. Cl. ............................................................G11b 5/38

[58] Field of Search .............179/100.2 CH, 100.2 C; 29/603

[56] References Cited

UNITED STATES PATENTS

| | | | |
|---|---|---|---|
| 2,866,013 | 12/1958 | Reis | 179/100.2 CH |
| 2,978,545 | 4/1961 | Howling | 179/100.2 CH |
| 3,114,009 | 12/1963 | Chamras et al | 179/100.2 CH |
| 3,163,721 | 12/1964 | Fuhrt et al | 179/100.2 CH |
| 3,260,980 | 7/1966 | Weiss | 179/100.2 CH |

FOREIGN PATENTS OR APPLICATIONS

| | | | |
|---|---|---|---|
| 893,449 | 10/1960 | Great Britain | 179/100.2 CH |
| 1,185,227 | 1/1965 | Germany | 179/100.2 CH |

*Primary Examiner*—Bernard Konick
*Assistant Examiner*—Robert S. Tupper
*Attorney*—Sughrue, Rothwell, Mion, Zinn & Macpeak

[57] ABSTRACT

A magnetic head having a sheet of magnetic material deposited or adhered with an insulating film directly to a sheet of conductive material and indirectly through a conductive film to a sheet of nonconductive material; a plurality of electromagnetic converting films provided on said insulating film; current, voltage and ground terminals formed on said electromagnetic converting films by ohmic connection of conductive material, said ground terminal being connected by said magnetic material or said conductive film at the side of sliding contact with a magnetic tape; and a magnetic substance having an insulating portion, at least at the surface thereof, connected independently of each other to each of said electromagnetic converting films. This magnetic head is manufactured by a method having the steps of depositing or adhering a plurality of electromagnetic converting films on a sheet of magnetic material, connecting a magnetic substance independently of each other on said respective electromagnetic converting films for supporting said electromagnetic converting films therebetween.

8 Claims, 10 Drawing Figures

MULTICHANNEL MAGNETIC HEAD HAVING A COMMON GROUND TERMINAL COUPLED TO A PIECE OF MAGNETIC MATERIAL ON THE FACE OF THE HEAD

BACKGROUND OF THE INVENTION

1. Field of the Invention

This invention relates to a magnetic head and, more particularly, to a magnetic reproducing head for multichannel use employing electromagnetic converting films, such as Hall elements.

2. Description of the Prior Art

Recent efforts to increase the amount of information storage per unit area of a magnetic tape have resulted in the use of multiple track tapes such as those having four or eight tracks on one magnetic tape. To provide multiple tracks within a specific width of a magnetic tape, the front recording portion of the magnetic head must be flattened so as not to interfere with adjacent tracks. Thus, the gaps between each track should be sufficiently small to be within the width of the track corresponding thereto.

Heretofore, the magnetic material, of the so-called ring shape, is wound as a coil for a multichannel magnetic head and is produced by the following two methods: The first method requires the necessary number of gap portions be within the magnetic head and then selecting electrically the specific gap portion on which to record or reproduce the information; the second method requires providing one or two gap portions within the magnetic head and recording or reproducing the multiple tracks on the magnetic tape by moving the magnetic head itself in a vertical manner.

The first method is difficult to manufacture because a multiple of coils are needed in one magnetic head, and with the second method an increase of crosstalk is introduced unless the magnetic head is moved elevationally with considerable accuracy. Further, the necessity of having a mechanism for moving the magnetic head in a vertical manner makes it difficult to make the recording and reproduction apparatus compact and light.

A semiconductor magnetic head was developed to eliminate the above-described problems. This semiconductor magnetic head uses an electromagnetic converting element, such as a Hall element, i.e., a magnetic resistive-effect element. Thus, the magnetic head can be the compact generating mechanism which is needed in a multichannel magnetic head. However, the magnetic head using these electromagnetic converting elements has a number of disadvantages, described hereinafter, which do not allow its successful use in an acoustic reproduction system required to reproduce with a high degree of fidelity. Firstly, since the necessary electromagnetic converting efficiency of the element cannot be obtained at present, the sensitivity of the element is lowered if the element is located in the rear gap of the ring core or in the gap at the side of the nonsliding contact with the magnetic tape. This causes the element to be difficult to use in practice. Secondly, when the element is located in the front gap of the ring core or in the gap at the point of sliding contact with the magnetic tape, the sensitivity of the element is so increased that the noise produced by the sliding friction between the magnetic tape and the Hall element is picked up resulting in a decrease in the signal/noise (S/N) ratio. This causes the head not to be suitable for reproduction of music. Thirdly, if the width of the gap is reduced to maximize the reproducing frequency, the width of the element must be small resulting in problems in mass producing the element. Fourthly, if the element is formed by depositing directly on the members constituting the magnetic circuit to make the element thin, that part of the magnetic circuit exposed to the high temperature during deposition must be sufficiently refractory yet must have minimal coefficient of thermal expansion.

SUMMARY OF THE INVENTION

It is, therefore, an object of the present invention to provide a simply constructed and less expensive magnetic head which eliminates the aforementioned disadvantages of the conventional magnetic head, using an electromagnetic converting element, and yet obtains the advantages described previously.

It is another object of the invention to provide a multichannel magnetic head which minimizes crosstalk between channels of a multichannel head.

It is a further object of the present invention to provide a magnetic head which improves the signal to noise ratio by restraining the production of noise.

It is still another object of the present invention to provide a magnetic head which can be mass produced reasonably.

The other objects, features and advantages of the present invention will become apparent from the following description with accompanying drawings.

Reference is made to the accompanying drawings.

Figure 1:
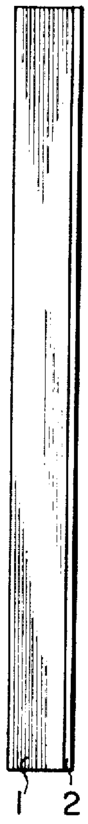
FIG. 1 is a front view of one-half of the magnetic head at the initial step in manufacturing the head.
Figure 2:
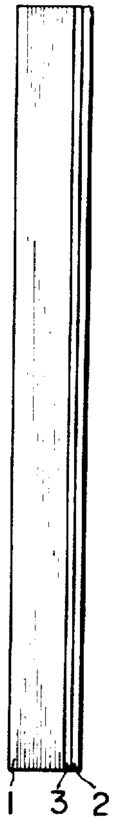
FIG. 2 is a front view showing another embodiment of the magnetic head shown in FIG. 1.
Figures 3A, 3B, 5:
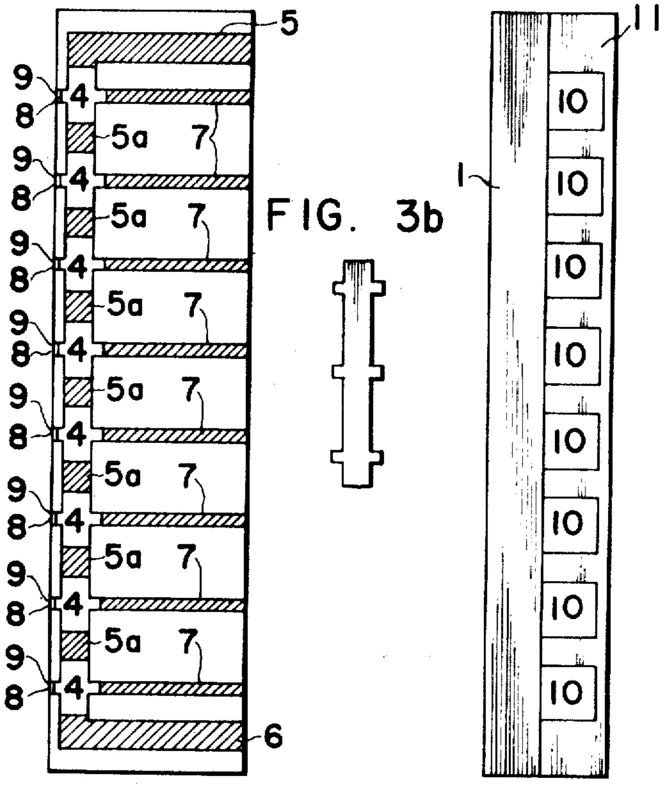

FIG. 3*a* is a right side view of the magnetic head shown in FIG. 1 or 2 showing the next step following the manufacturing step shown in FIG. 1 or 2.

Figure 4:
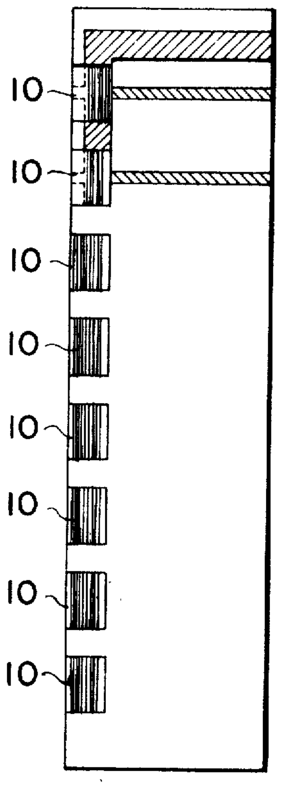
Figure 6:
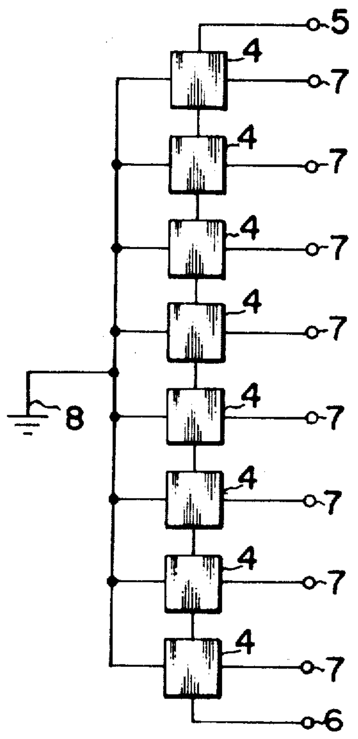
Figure 7:
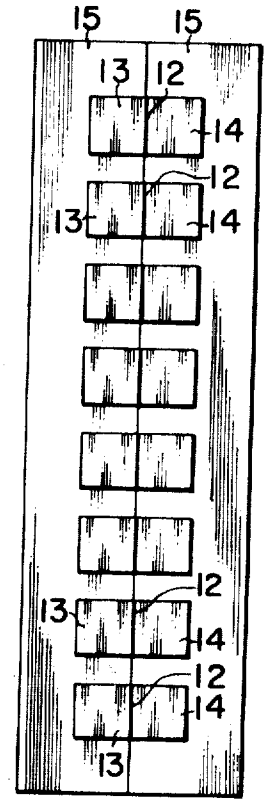
Figure 8:
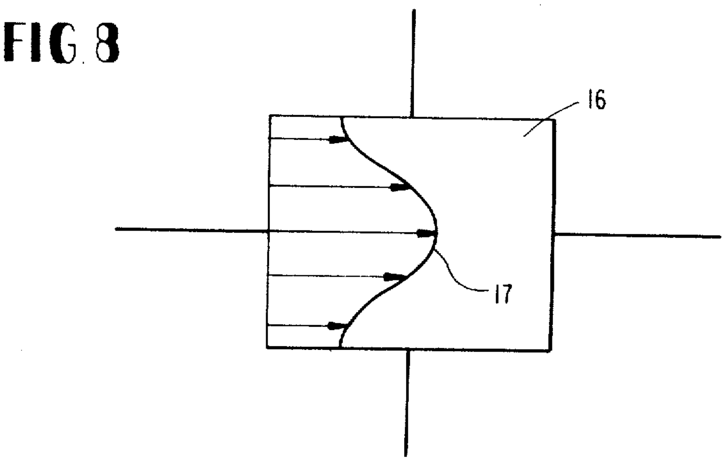
Figure 9:
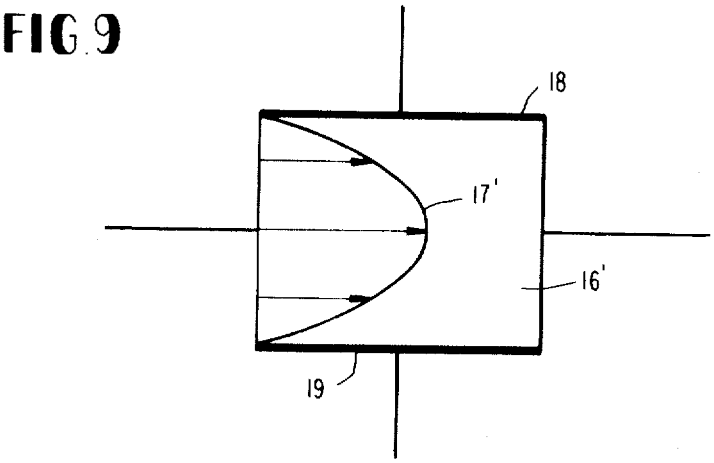

FIG. 3*b* is a view of another embodiment of the head shown in FIG. 3*a*;

FIG. 4 is an explanatory view of the next step of the manufacturing step shown in FIG. 3*a* showing the right side of the magnetic head shown in FIG. 1 or 2;

FIG. 5 is a front view of the magnetic head completed;

FIG. 6 is a circuit diagram showing the electrical connecting relationships within the magnetic head shown in FIG. 3*a*;

FIG. 7 is a front view of a conventional magnetic head using a Hall element;

FIG. 8 shows the voltage distribution on a Hall element;

FIG. 9 shows the voltage distribution on a short-circuited Hall element of the preferred embodiment.

Referring now to the drawings and particularly to FIG. 1, which shows one-half of a magnetic head at the initial step of manufacturing the magnetic head, reference numeral 1 designates a piece of magnetic material of a substance having a high magnetic permeability; 2 shows an insulating film formed on the surface of the magnetic substance. When the magnetic substance 1 is nonconductive, a conductive film 3 is formed between the magnetic substance 1 and the insulating film 2 as shown in FIG. 2. In FIG. 3*a*, 4 illustrates a film of the electromagnetic converting element, (for example a Hall element) which will hereinafter be termed the film in the embodiment, provided on the insulating film 2 by the deposition or adhesion, thereby determining the size and number of tracks of the magnetic tape.

The film 4 may be a continuous shape of dependent film as shown in FIG. 3*b*. Reference numerals 5 through 8 designate the lead portion of conductive substance in ohmic connection with the film 4. Reference numerals 5 and 6 designate the control current terminal; 5*a* is a connecting terminal for short circuiting the respective films 4; 7 illustrates an output terminal; and 8 is a ground terminal. The connecting relationships between the films 4 and these terminals are shown in FIG. 6. When a Hall voltage is produced between the output terminal 7 of one film 4 and the ground terminal 8, the same directional potential, horizontal in the drawing, is produced at both the upper and lower ends of the film 4, respectively. The upper and lower ends of the respective films 4 are short circuited horizontally by the connecting terminals 5*a*, so that the potential does not result in the production of crosstalk due to the application simultaneously to the other adjacent films 4 of a series circuit formed between the control current terminals, 5 and 6, resulting in the control current of the respective films 4 being common with each other. Therefore, as shown in FIG. 3*b*, when the film 4 is continuous, a portion corresponding to the lead portion 5*a* is provided. And, when the upper and lower ends of the respective films 4 are short circuited in a horizontal direction, the gap between the respective films 4 can be narrow. In this case, the electromotive force produced in the horizontal direction of the narrow portion is essentially zero so that the same effect as short circuiting is obtained. Consequently, the crosstalk is so small that it can be ignored. Also, 9 designates a cutout portion cut out of the insulating film 2, shown in FIG. 1 or FIG. 2, and exposed to the conductive film 3 or magnetic substance 1, so that when the insulating film 2 is formed, the cutout portion 9 is such that it is not covered. Therefore, the film 4 is connected to the magnetic substance 1 or conductive film 3 at the cutout portion 9 so that it is electrically short circuited. Accordingly, even if the aforementioned ground terminal 8 is not provided, bad contact does not occur. When the ground terminal 8 is not provided and when the space is filled with a nonmagnetic material, no magnetic powder on the magnetic tape is used so that the film 4 is completely sealed. A piece of magnetic material such as magnetic tip 10, with a high magnetic permeability and having an insulator on the surface, is adhered to the respective film 4 as shown in FIG. 4. The film 4 is fixed between the magnetic substance 1 and the magnetic tip 10, as shown in the front view of FIG. 5. 11 is a holding member for holding the magnetic tip 10. As shown in FIG. 5, the magnetic tip 10 is positioned at a predetermined place in the holding member 11. Thereafter, the magnetic substance 1 is threaded to the holding member 11 so as to position it between the films 4. In order to support the films 4 between the magnetic substance 1 and the magnetic tip 10, the magnetic resistance between the respective film 4 is somewhat decreased by the magnetic substance on one side so that crosstalk was observed but was not a problem on actual usage. Film 4 is slightly recessed from the front edge of magnetic substance 1. Magnetic substance 1 forms the face of the magnetic head which contacts the magnetic tape.

As previously described, the films 4 are formed on one sheet of magnetic substance 1 corresponding to the number of tracks. Then a multiple of magnetic tips 10 are connected to correspond to the respective films 4. Accordingly, films 4 may be formed all on one sheet of magnetic substance 1 causing its production to be extremely simple. Specifically, as shown in FIG. 7, showing the conventional magnetic head using a Hall element manufactured in the conventional method, compared with the method in which the films 12, corresponding to the tracks, are supported between the magnetic substances 13 and 14 so that they are held by the holding member 15 to form the completed overall magnetic head. In other words, film 4 is placed on the surface of only one-half of the magnetic head by electrodeposition, and then the other half consisting of only a magnetic substance is affixed to the first half. No critical alignment problems or manufacturing difficulties found in the prior art are encountered. The invention provides a method for controlling easily and accurately (1) the relationship between the respective films 4, and (2) the relative position of the film 4 and the magnetic tip 10. Even where an adhesive (not shown) is poured between the magnetic tip 10 and the holding member 11 to secure the magnetic tip 10 in the holding member 11 or where the holding member 11 does not have the necessary refractory properties, no problem occurs due to the exposure of high temperature on deposition thereof and even if the expansion coefficients of the magnetic tip 10 and the holding member 11 are different, the occurrence of cracks is not a concern. Accordingly, the range of suitable materials are broadened so that accurate positioning can be accomplished using less expensive materials.

Since a film having a sufficient electromagnetic converting efficiency or sensitivity has not been developed, the method of contacting the film on the magnetic tape surface closely to maximize the output signal or to expose the film to the largest magnetic flux density of the position is not limiting. However, the noise occurring due to the sliding friction between the magnetic tape and the film is such that the signal/noise ratio is lowered. Since the crosstalk between the respective films 4 is extremely small, crosstalk is not a problem even where the electromagnetic converting efficiency of the films 4 is somewhat decreased. Accordingly, the films 4 may be recessed somewhat from the front face of the magnetic head without contacting closely the magnetic tape with the films 4. Therefore, since films 4 are not directly contacted with the magnetic tape, the noise due to the sliding contact, the deterioration of the hole element 4, or the deformation of the hole element 4 is eliminated thereby.

Since the output terminal of film 4 can be recessed in the film 4 and the terminal is made a ground terminal, the electric circuit will remain stable even if any conductive foreign matter is contacted with the head when the magnetic tape is not mounted.

Since the ground terminal 8 of the output terminal 7 is common through the magnetic substance 1 or conductive film 3, not only can the number of overall terminals be reduced when using a multichannel magnetic head, but also the necessity for attaching the terminal at the side contacting the magnetic tape at the terminals of the films 4 can be eliminated.

FIGS. 8 and 9 explain the manner in which the short circuit between the film 4 reduces the edge voltages of the films and thereby the crosstalk. FIG. 8 shows a Hall element 16 having a voltage vector distribution shown by curve 17. FIG. 9 shows a Hall element 16' having short-circuiting portions 18 and 19. These portions short the edge of the Hall element to the respective adjacent Hall elements. In this embodiment the voltage vectors have a distribution shown by line 17'. The voltage at the edges of short-circuited element 16' is zero as compared to the positive value on the edges of element 16. The voltage on the edges of element 16 will produce crosstalk between adjacent elements. Therefore, short circuiting adjacent Hall elements reduces the edge voltage to zero and thereby substantially eliminates crosstalk between the adjacent elements.

What is claimed is:

1. A plural track magnetic head having a face for contacting a magnetic tape and comprising:

a. a first piece of magnetic material;

b. an insulating film covering a portion of said first piece of magnetic material;

c. a plurality of electromagnetic converting means for converting between magnetic signals and electrical signals and affixed to said insulating film wherein each of said electromagnetic converting means corresponds to one of said tracks;

d. a plurality of second pieces of magnetic material having an insulating layer on a surface thereof, each of said second pieces of magnetic material being affixed to a different one of said electromagnetic converting means; and e. control current terminals, output terminals and ground terminals on each of said electromagnetic converting means, all of said ground terminals being coupled in common to said first piece of magnetic material on the face of said head and each of said output terminals corresponding to one of said tracks.

2. A magnetic head as set forth in claim 1 further including short-circuiting means for coupling the control current terminals of each electromagnetic converting means to the control current terminals of the adjacent electromagnetic converting means for providing a short circuit between adjacent electromagnetic converting means.

3. A magnetic head as set forth in claim 1 wherein said electromagnetic converting means is recessed from said face of said head.

4. A magnetic head as set forth in claim 3 wherein: said first piece of magnetic material supports said electromagnetic converting means and is conductive; said insulating layer is between said electromagnetic converting means and said second piece of magnetic material; and wherein said electromagnetic converting means is connected to said first piece of magnetic material at a point adjacent to the magnetic tape so that said piece of magnetic material is grounded.

5. A magnetic head as set forth in claim 3 wherein said first piece of magnetic material supports said electromagnetic converting means and is nonconductive, and wherein said electromagnetic converting means is connected to a conductive film on said first piece of magnetic material at a position adjacent to the magnetic tape and wherein said conductive film is grounded.

6. A magnetic head as set forth in claim 3 wherein one of said terminals of said electromagnetic converting means is positioned adjacent to the magnetic tape.

7. A magnetic head as set forth in claim 6 wherein the ground terminal of said electromagnetic converting means is positioned adjacent to the magnetic tape.

8. A method of manufacturing a plural track magnetic head on a first piece of material having a high magnetic permeability comprising the steps of:

a. affixing an insulating layer to said first piece of material;
b. depositing a plurality of Hall elements on said insulating layer and said first piece of material such that said Hall elements have a common ground terminal on said first piece of material each of said Hall elements corresponding to one of said tracks;
c. affixing a second piece of magnetic material over said Hall elements such that said Hall elements are supported between said first piece and said second piece of material; and
d. affixing control current terminals and output terminals on each of said Hall elements.

* * * * *